May 21, 1940.  A. BURNETT  2,201,715
CLUTCH MECHANISM
Original Filed Aug. 24, 1937   5 Sheets-Sheet 5

Alexander Burnett
Inventor

By Norbert E. Birch
Attorney

Patented May 21, 1940

2,201,715

UNITED STATES PATENT OFFICE 2,201,715

CLUTCH MECHANISM

Alexander Burnett, Chicago, Ill., assignor to Industrial Patents Corporation, Chicago, Ill., a corporation of Delaware Original application August 24, 1937, Serial No. 160,719. Divided and this application May 3, 1939, Serial No. 271,562

3 Claims. (Cl. 192—28)

This invention relates to an improved clutch especially adapted for driving machines such as, for example, measuring and filling machines. This application is a division of Patent No. 2,176,121 which issued October 17, 1939.

One of the objects of the invention is to provide an improved clutch mechanism.

Another object of the invention is to provide an improved clutch mechanism having automatic throw-out means.

Another object of the invention is to provide an improved clutch means for driving machines such as, for example, measuring and filling machines.

Other objects of the invention will be apparent from the description and claims which follow.

Attention is directed to the drawings in which like characters of reference are used to designate similar elements.

Figure 1:
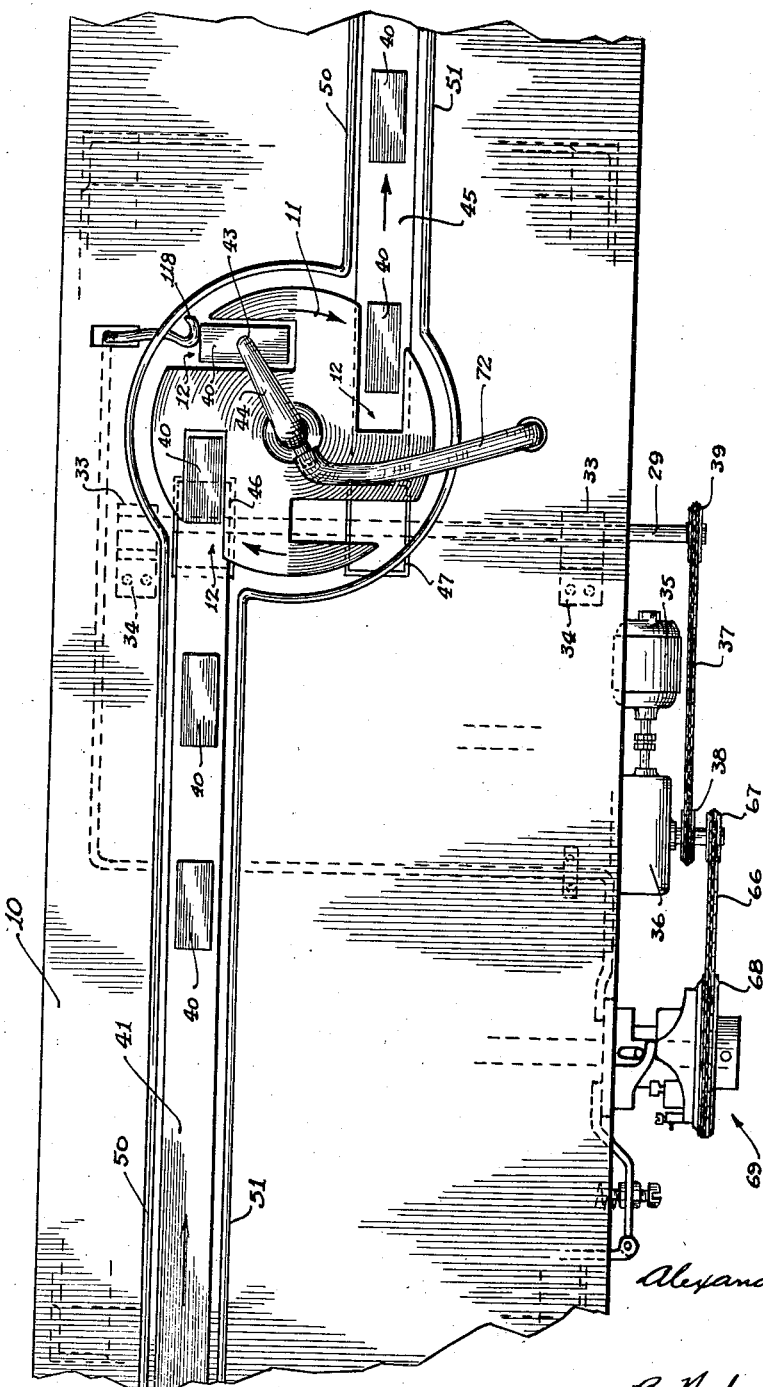
Figure 1 is a plan view of a measuring and filling device constructed in accordance with the present invention.

The device of the present invention is mounted upon suitable framework 1 comprising standards 2, 3, 4 and 5, cross members 6 and 7, end members 8 and 9, and top 10.

Turret 11 is provided with carton receiving pockets 12 and is rigidly secured to tubular shaft 13, the shaft 13 being rotatably mounted in collar bearing 15 fixedly secured at opening 14 in top 10.

Drive plate 16 is rotatably secured on shaft 13 for movement relative to ratchet member 17 rigidly secured to shaft 13. Drive plate 16 is provided with pawl 18 held in constant engagement with ratchet 17 by spring 19. Plate 16 is oscillated on shaft 13 by reciprocating rod 20 and, in turn, serves to intermittently rotate turret 11 through the medium of ratchet 17 and pawl 18. Rod 20 is pivoted at one end, as at 21, to plate 16 and at its opposite end, is slidably mounted on shaft 22 through slot 23.

Shaft 22 is journaled in bearings 24 and 25 rigidly secured to cross members 6 and 7. Cam 26 is pinioned, or otherwise secured, to shaft 22. Rod 20 is held adjacent cam 26 by collar 27 rigidly secured to shaft 22. Rod 20, at either side of slot 23, is provided with roller bearings 28 and is reciprocally operated by rotation of cam 26 against the bearings 28.

Shaft 22 is continuously driven from shaft 29 through the medium of chain 30 and sprockets 31 and 32. Shaft 29 is journaled in suitable bearings 33 rigidly secured, as by brackets 34, to the under surface of top 10, and is continuously driven by power transmitted from motor 35 through the medium of gear box 36, chain 37 and sprockets 38 and 39.

As shown in Figure 1, empty cartons 40 are fed one after the other on endless conveying belt 41 and into pockets 12 of turret 11. At each movement of turret 11, the carton last fed from conveying belt 41 is moved into filling position below discharge end 43 of nozzle 44 and simultaneously the carton last filled is moved to a position from nozzle 44 onto discharge conveyor 45 whence it is carried from the machine.

Conveying belt 41 is continuously driven on pulley 46 and conveyor belt 45 is continuously driven on pulley 47. Each of the pulleys 46 and 47 is rigidly secured to shaft 29.

Guide rails 50 and 51 are secured adjacent either side of the path defined by conveyors 41 and 45 and turret 11 for securing the cartons within their proper limits during travel through the machine.

Figure 4:
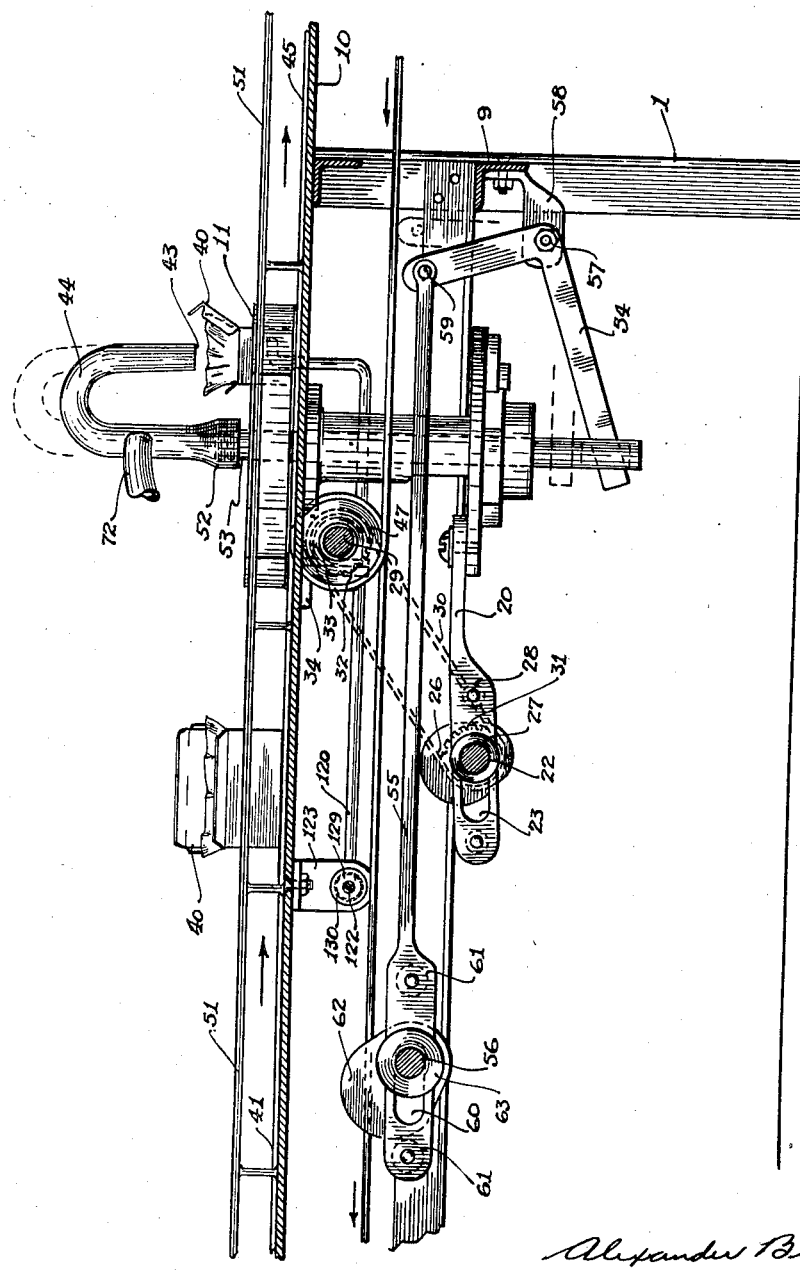
Figure 4 is a side view, partly in section, taken substantially on line 4—4 of Figure 2.
Figure 5:
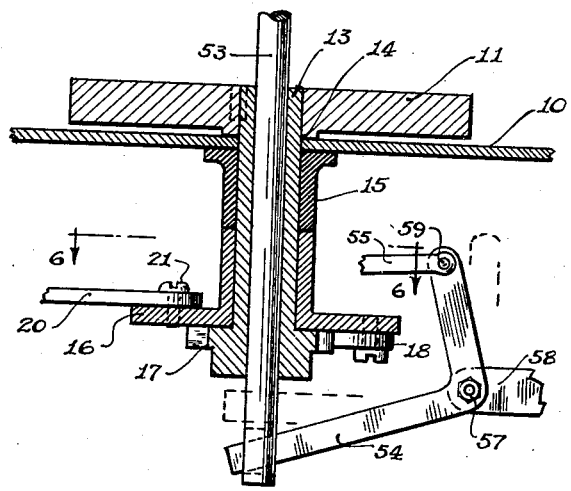
Figure 5 is an enlarged detailed view, partly in section, of the turret mechanism.
Figure 6:
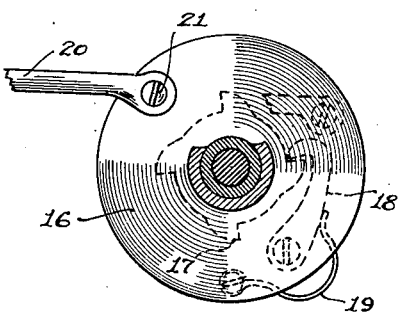
Figure 6 is a view taken on line 6—6 of Figure 5.

As shown in Figure 4, discharge nozzle 44 is reciprocally mounted for movement relative to the pockets of turret 11. The movements of nozzle 44 are effected in synchronism with the movements of turret 11 so that following movement of each carton into filling position, the nozzle is lowered relative to the carton before discharge of the material into the carton. The lowering of the nozzle minimizes the drop of the discharged material and thus prevents spattering of the material. After filling of the carton, the nozzle is raised relative to the carton prior to the next movement of the turret.

Nozzle 44 is threaded, as at 52, to rod 53 slidably mounted in tubular shaft 13. Rod 53 is reciprocated through the medium of bell crank lever 54 connected through the medium of rod 55 with drive shaft 56. Lever 54 is pivoted, as at 57, on bracket 58 rigidly secured to end member 9. Rod 55 is pivoted at one end, as at 59, to lever 54 and at its other end is mounted through slot 60 for slidable movement on shaft 56. Rod 55, at either end of slot 60, is provided with bearing members 61. Cam 62 rotates with shaft 56 and serves to reciprocate rod 55 through engagement with bearing members 61. Rod 55 is held adjacent cam 62 by collar 63 pinioned on shaft 56.

Shaft 56 is journaled in bearing 64 rigidly secured to frame member 6 and sleeve bearing 65 rigidly secured to frame member 7 and is adapted for continuous rotation. Power is transmitted to shaft 56 from motor 35 through the medium of gear box 36, chain 66, sprockets 67 and 68 and clutch element 69. The operation of clutch element 69 will be hereinafter more fully described.

Figure 2:
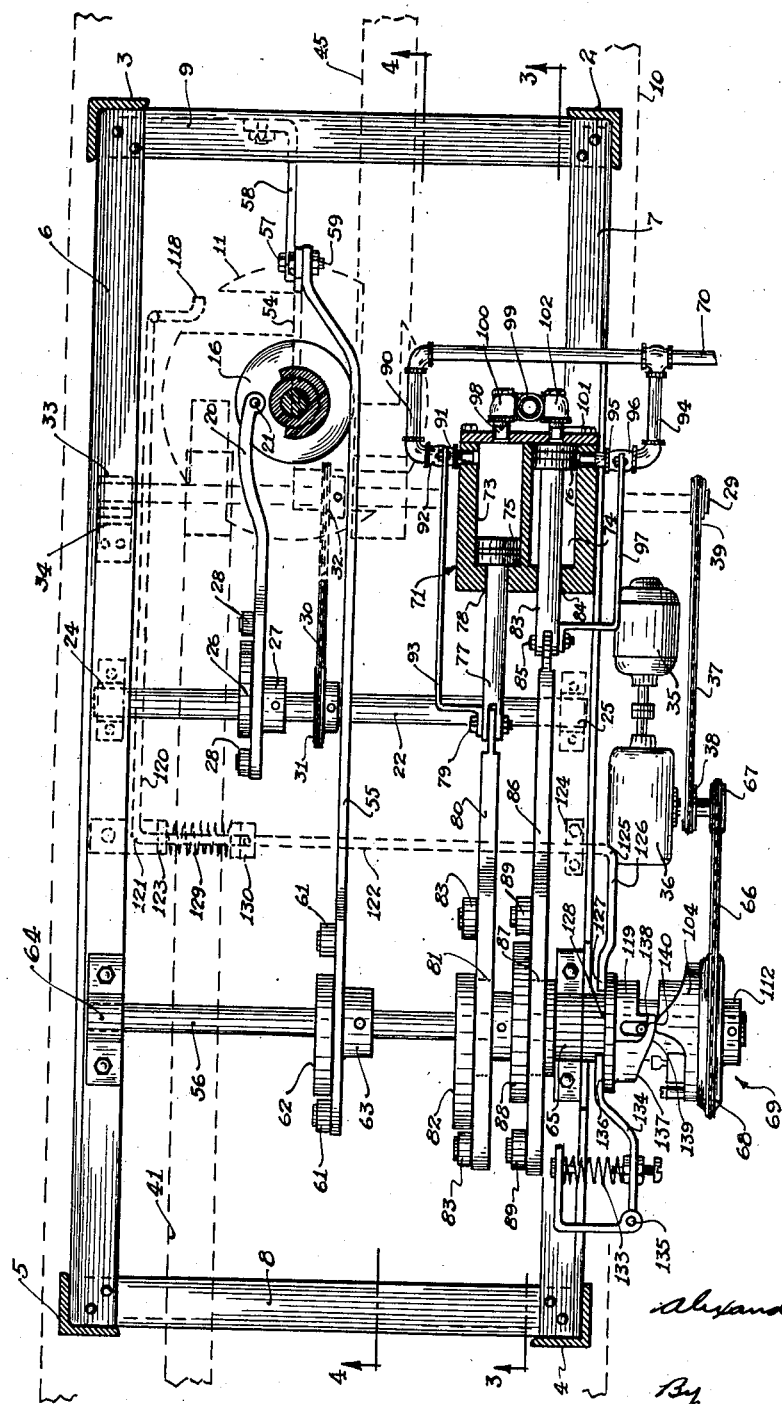
Figure 2 is a top view, partly in section, taken substantially on line 2—2 of Figure 3, the turret and conveying means being shown in dotted lines.
Figure 3:
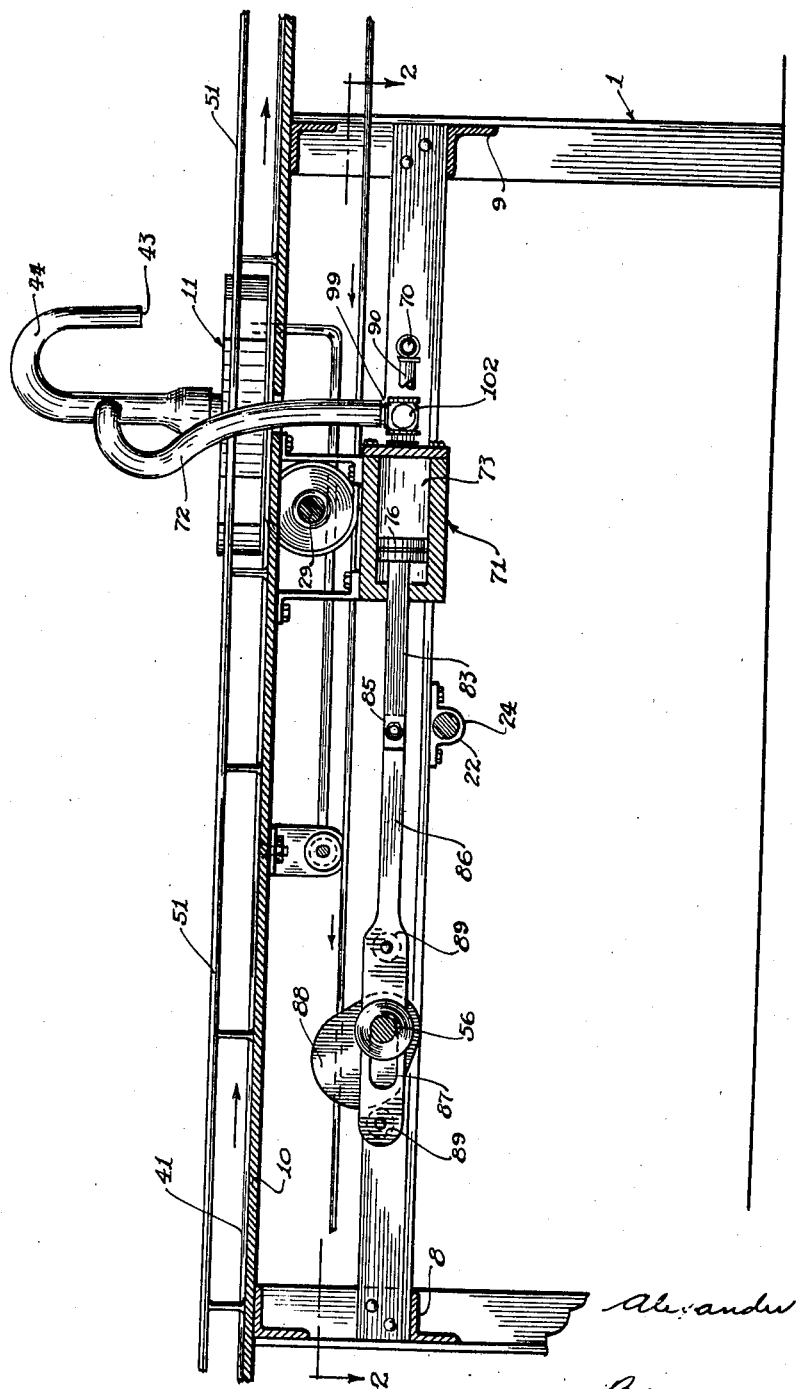
Figure 3 is a side view, partly in section, taken substantially on line 3—3 of Figure 2, parts being omitted.

As shown in Figures 1, 2 and 3, the material delivered through supply line 70, which extends from a source of supply not shown, is measured in predetermined amounts in measuring device 71. The measured material is forced from measuring device 71 through flexible line 72 and nozzle 44 in synchronism with the movement of the cartons in turret 11.

Measuring device 71 comprises cylinders 73 and 74 respectively provided with pistons 75 and 76 mounted for relatively opposite movements. Piston 75 is rigidly secured to connecting rod 77 mounted through opening 78 of cylinder 73. Connecting rod 77 is pivotally connected, as at 79, to drive rod 80, mounted as through slot 81 for slidable movement on shaft 56. Reciprocal movement is imparted to rod 80 and thus to rod 77 and piston 75 through rotation of cam 82 in engagement with bearing members 83.

Piston 76 is secured to connecting rod 83 mounted through opening 84 in cylinder 74. Rod 83 is pivotally connected, as at 85, to drive rod 86 mounted, as through slot 87, for slidable movement on shaft 56. Reciprocal movement is imparted to rod 86 and thus to rod 83 and piston 76 through rotation of cam 88 in engagement with bearings 89. It will be noted that cams 82 and 88 are mounted on shaft 56 so as to provide a relatively opposite movement of the pistons 75 and 76. It will be noted also that when one of the pistons 75 and 76 is being moved in a direction to measure a supply of material the other of the pistons is being moved in a direction to discharge a previously measured supply of material.

It will be seen further that through proper spacing of bearings 83 and 89 relative to their respective cams 82 and 88 pistons 75 and 76 will momentarily remain idle at each of their extreme movements. This idleness is timed to permit one complete movement of the turret between each discharge of the material.

Material from supply line 70 is directed to cylinder 73 through lines 90 and 91, the line 91 being provided with shutoff valve 92 operable through rod 93 by movement of connecting rod 77. Material from line 70 is directed to cylinder 74 through lines 94 and 95, the line 95 being provided with shutoff valve 96 operable through rod 97 by movement of connecting rod 83.

The material forced from cylinder 73 is directed through line 98, header 99, flexible tubing 72 and nozzle 44. Line 98 is provided with check valve 100, preferably of the suction type. Material forced from cylinder 74 is directed through line 101, header 99, flexible tubing 72 and nozzle 44. Line 101, like line 98, is provided with a check valve 102, also of the suction type.

Check valves 100 and 102 are operated through suction caused by intake movement of their respective pistons and thus serve to close their respective lines in the direction from the nozzle to the piston. The suction exerted in closing each of the valves, however, is reflected throughout the discharge line and thus at the discharge end 43 of nozzle 44, by which dripping of material from nozzle 44, between filling of the cartons, is prevented.

Figure 8:
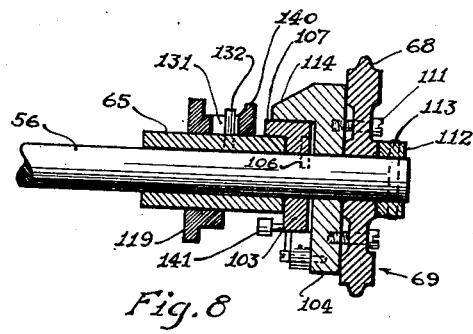
Figure 8 is an enlarged detailed view, partly in section, of the clutch assembly.
Figure 9:
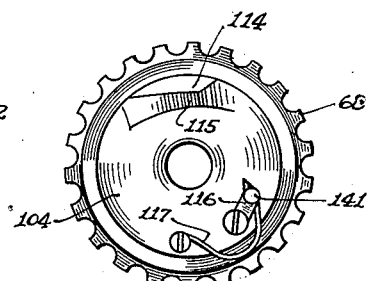
Figure 9 is a side view of the main clutch plate and drive sprocket.
Figure 7:
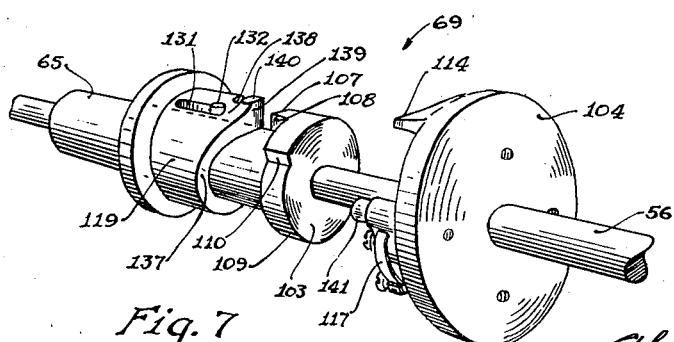
Figure 7 is an enlarged view, in perspective, illustrating the clutch mechanism. In this figure the main clutch plate is shown removed from the other clutch elements.

As shown in Figure 2 and more in detail in Figures 7, 8 and 9, clutch assembly 69 comprises driven wheel 103 and clutch disk 104. Driven wheel 103 is rigidly secured, as by pin 106, to shaft 56 and is mounted adjacent sleeve bearing 65. Driven wheel 103 is axially flanged as at 107 to provide shoulder 108 and at its peripheral edge is provided with cam surface 109 thus providing shoulder 110. As seen in Figure 8, flange 107 rotates relative to the outer periphery of sleeve 65.

Sprocket 68 is rigidly secured, as by bolts 111, to clutch disk 104. Sprocket 68 and clutch disk 104 are secured on shaft 56 as by collar 112 and pin 113 and are free to rotate on shaft 56 except when in driving engagement with driven wheel 103. As seen in Figures 8 and 9, clutch disk 104 is axially flanged, as at 114, to provide cam surface 115. Flange 114 is adapted for rotation relative to the outer periphery of driven wheel 103.

In operation, clutch disk 104 is normally maintained in driving engagement with driven wheel 103 by pawl 116 normally pivotally urged by the action of spring 117 against shoulder 110 of driven wheel 103. In the event, however, a carton fails to feed to a pocket of the turret, it is desired to prevent discharge of material from the nozzle when and as the empty pocket is moved relative to the nozzle. This is accomplished by momentarily releasing pawl 116 from against shoulder 110 of driven wheel 103 whereby clutch disk 104 and sprocket 68 will be free to rotate one complete revolution without driving the shaft 56.

The mechanism for releasing pawl 116 comprises guard member 118 and clutch throwout member 119.

As shown in Figure 2, guard member 118 is formed integral with rod 120, bent as at 121, to provide rod 122. Rod 122 is slidably mounted for longitudinal movement in bracket 123 rigidly secured to frame member 6 and bracket 124 rigidly secured to frame member 7. Rod 122 is bent, as at 125, to provide rod 126. The free end 127 of rod 126 presses against face 128 of clutch member 119 and serves to urge clutch member 119 in a direction toward clutch disk 104 when guard member 118 is moved into an empty pocket of the turret.

Guard member 118 is normally urged against the periphery of turret 11 and thus for movement within an empty pocket of turret 11 by pressure of coiled spring 129 secured on rod 122 against bracket 123. The tension of spring 129 may be regulated by collar 130 rigidly secured on rod 122.

It will be seen that clutch member 119 is adapted for longitudinal movement on sleeve 65 within the limits defined by slot 131 and pin 132. The movement of clutch member 119 toward clutch disk 104, as by the action of rod 126 and spring 129, may be augmented by the action of spring 133 and arm 134 pivotally secured to rigid bracket 135. The free end 136 of arm 134 is maintained in constant contact with face 128 of clutch member 119 at a point relatively opposite to the point of contact of free end 127 of rod 126. The tension of spring 133 should be of itself insufficient to urge clutch member 119 in the direction toward clutch disk 104. Spring 133 is, in fact, a balance spring, the tension of which, when combined with the tension of spring 129 when that spring is brought into play, will serve to quickly move clutch member 119 in equilibrium in the direction toward clutch disk 104.

As shown in Figures 2 and 7, clutch member 119 is axially flanged as at 137 to provide axial cam surface 139 and shoulder 138. A radial cam surface 140 is also provided on the peripheral surface of axial flange 137. In the operation of the device hereinafter described, it will be seen that when clutch member 119 is pressed to its forwardmost position toward clutch disk 104, radial cam 140 is made to contact with knob 141 of pawl 116 whereby pawl 116 is disengaged from shoulder 110 of driven wheel 103, and thus the clutch disk 104 and sprocket 68 made free to rotate on drive shaft 56. It will also be seen that after one revolution of sprocket 68 on driven shaft 56, axial cam 139 will be made to contact axial cam 114 whereby clutch member 119 will be thrown to its retracted position away from clutch disk 104.

In operation, pawl 116 is normally urged by spring 117 against shoulder 110 of driven wheel 103 thus completing the connection between drive sprocket 68 and shaft 56 by which to rotate the several cams 62, 82 and 88.

In the event a carton fails to feed to a pocket of turret 11, guard member 118, through action of spring 129, will move within the empty pocket and through rods 120, 122 and 126 will press clutch member 119 in the direction toward driven wheel 103 and clutch disk 104. Driven wheel 103 will continue to rotate until shoulder 108 of the driven wheel 103 is mated with shoulder 138 of clutch member 119 whence clutch member 119 will be free to move to its forwardmost position toward clutch disk 104. When clutch member 119 is moved to its forwardmost position, knob 141 of pawl 116 will ride against radial cam 140 of clutch member 119 and thus raise pawl 116 out of engaging position with wheel 103.

When the pawl 116 is released from engaging position with wheel 103, clutch disk 104 and sprocket 68 are made free to rotate one complete revolution on shaft 56 whence the rotation of the several cams 62, 82 and 88 and the functions of their respective elements, particularly the discharge of material from the nozzle 44, are prevented for one complete movement.

In the meantime, the shafts 22 and 29 being continuous, the turret 11 will be rotated in due order and the carton fed to the next succeeding pocket of the turret will be moved into filling position relative to the nozzle 44. The next movement of the turret will return guard member 118 against the outer periphery of the turret and thereby release the pressure of spring 129 against clutch member 119.

Also axial cam 114 will strike against axial cam 139 and thus throw clutch member 119 to its retracted position away from clutch disk 104, whence pawl 116 will be free to reengage shoulder 110 of wheel 103 and again complete the connection between clutch disk 104 and wheel 103.

It will be seen that the several features exemplified in the present invention are made to operate in synchronism with one another and that in the event a carton fails to feed to a pocket of the turret 11, operation of the material discharge mechanism and the nozzle operating mechanism are discontinued one complete movement without interruption to the operation of the turret and carton feeding mechanism.

It will be understood that changes may be made in the structure of the apparatus shown in the drawings without departing from the spirit of the invention as described in the claims whch follow.

I claim:

1. A clutch mechanism comprising a shaft, a wheel rigidly affixed on the shaft, the wheel having a radial cam surface providing a peripheral shoulder and an axial cam surface providing an axial shoulder, a drive disk rotatably mounted on the shaft, the disk being provided with an axial cam surface and a spring-tensioned pivoted pawl detachably engageable with the peripheral shoulder of the wheel, a member slidably mounted on the shaft for longitudinal movement toward and from the wheel, the member being provided with a radial cam surface and with an axial cam surface providing an axial shoulder, the axial shoulder of the member upon movement of the member toward the wheel being adapted to mesh with the axial shoulder of the wheel for timed movement of the radial cam surface of the member against the pivoted pawl to disengage the pivoted pawl from the peripheral shoulder of the wheel and to prevent rotation of the wheel and shaft for one complete revolution of the disk, the axial cam surface of the disk being operable to engage the axial cam surface of the member following disengagement of the pawl from the shoulder of the wheel to return the member in the direction away from the wheel and means operable to move the member toward the wheel.

2. A clutch mechanism comprising a shaft having a wheel rigidly affixed thereon, the wheel having a radial cam surface providing a peripheral shoulder, a drive disk freely rotatable on the shaft, the disk being provided with an axial cam surface and a spring tensioned pawl detachably engageable with the peripheral shoulder of the wheel, a rotatably fixed member slidably mounted on the shaft for longitudinal movement toward and from the wheel, means adapted to move the member toward the wheel, the member being provided with a radial cam surface and with an axial cam surface, the radial cam surface of the member being operable upon movement of the member toward the wheel to disengage the pawl from the peripheral shoulder of the wheel, and the axial cam surface of the disk being operable to engage the axial cam surface of the member following disengagement of the pawl from the peripheral shoulder of the wheel to return the member in the direction away from the wheel, whereby driven rotation of the wheel and the shaft is prevented for one revolution.

3. A clutch mechanism comprising a shaft having a wheel rigidly affixed thereon, the wheel having a radial cam surface providing a peripheral shoulder and an axial cam surface providing an axial shoulder, a drive disk freely rotatable on the shaft adjacent the wheel, the disk being provided with an axial cam surface and a spring tensioned pawl detachably engageable with the peripheral shoulder of the wheel, a bearing mounting the shaft, a rotatably fixed member slidably mounted on the bearing for longitudinal movement toward and from the wheel, means adapted to move the bearing toward the wheel, the member being provided with a radial cam surface and with an axial cam surface providing an axial shoulder, the axial shoulder of the member upon movement of the member toward the wheel being adapted to mesh with the axial shoulder of the wheel for timed movement of the radial cam surface of the member against the pawl to disengage the pawl from the peripheral shoulder of the wheel and the axial cam surface of the disk being operable to engage the axial cam surface of the member following disengagement of the pawl from the shoulder of the wheel to return the member in the direction away from the wheel whereby driven rotation of the wheel and the shaft is prevented for one revolution.

ALEXANDER BURNETT.